United States Patent [19]

Radnoti

[11] 4,055,498
[45] Oct. 25, 1977

[54] SELECTIVE FILTRATION APPARATUS

[76] Inventor: Desmond Arpad Radnoti, 670 Alta Vista, Sierra Madre, Calif. 91024

[21] Appl. No.: 602,406

[22] Filed: Aug. 6, 1975

[51] Int. Cl.² .............................................. B01D 35/00
[52] U.S. Cl. ..................................... 210/94; 210/232; 210/317; 210/339; 210/418; 210/446; 210/500 M
[58] Field of Search ................... 210/232, 317, 323 R, 210/339, 418, 446, 463, 500 M

[56] References Cited

U.S. PATENT DOCUMENTS

| | | | |
|---|---|---|---|
| 3,250,395 | 5/1966 | Blume | 210/317 X |
| 3,360,128 | 12/1967 | Federline | 210/232 X |

FOREIGN PATENT DOCUMENTS 249,696  10/1966  Austria ................................. 210/446

Primary Examiner—Frank A. Spear, Jr.
Assistant Examiner—Richard W. Burks
Attorney, Agent, or Firm—Witherspoon, Lane & Hargest

[57] ABSTRACT

Filtration apparatus that is very versatile is disclosed. The apparatus includes a porous filter disc that can be readily interchanged with other filter discs having the same or different porosity. In addition, a membrane filter can be used in conjunction with the porous filter disc. The porous filter disc serves as a support for the membrane filter. The porous filter disc and membrane when provided are designed to interfit with the balance of the filtration apparatus in such a manner that the filtration unit is simple in construction and highly versatile in use.

11 Claims, 10 Drawing Figures

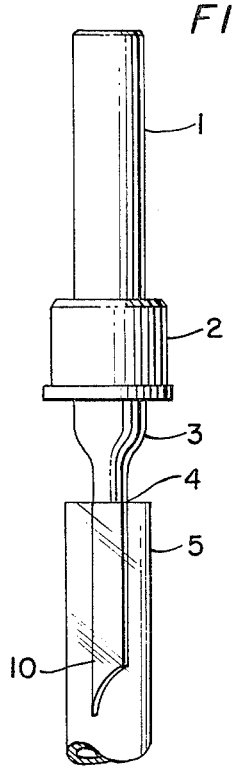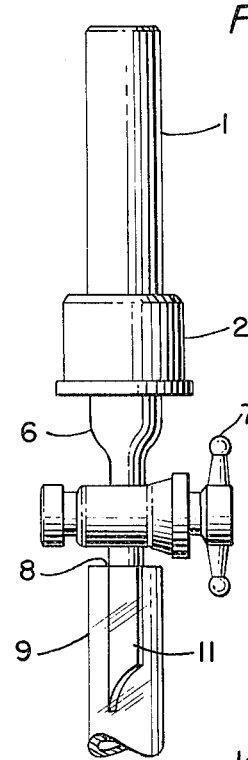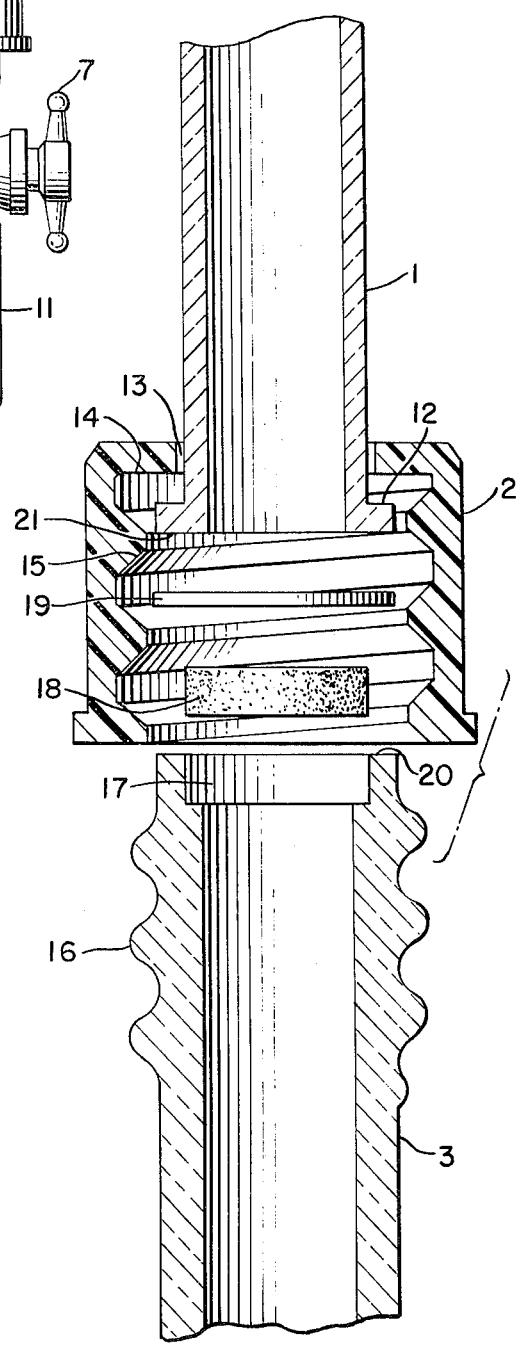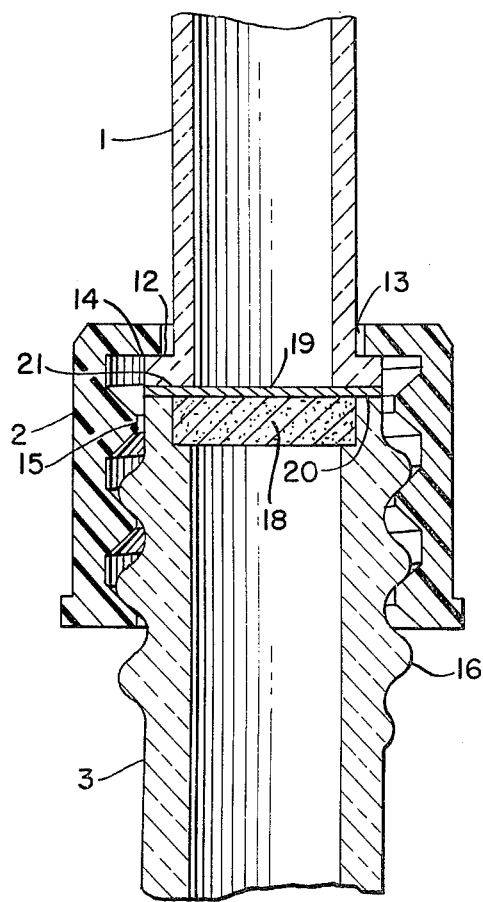

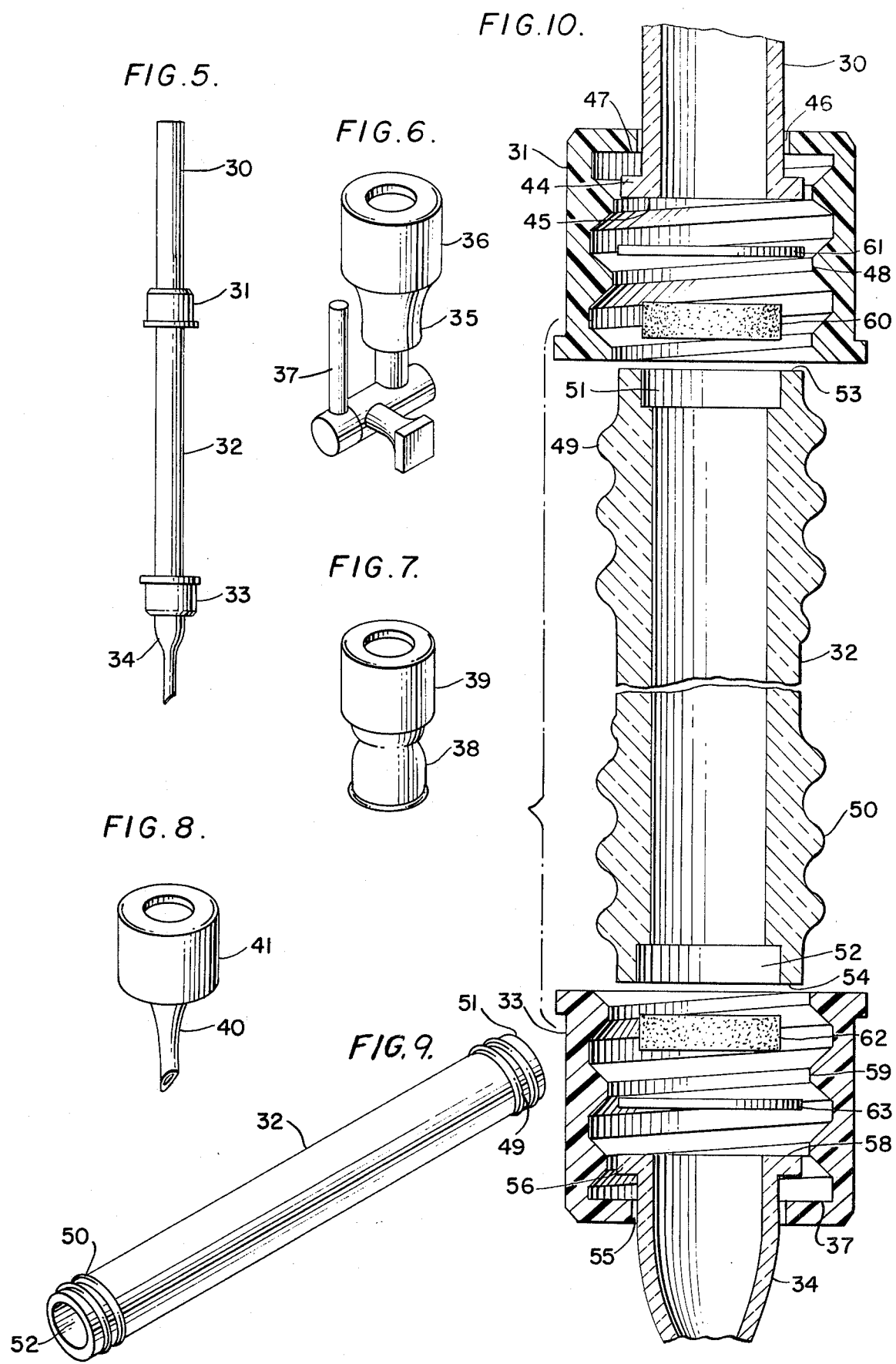

SELECTIVE FILTRATION APPARATUS

BACKGROUND OF THE INVENTION

This invention relates to filtration apparatus, and more particularly, to selective filtration apparatus having a readily interchangeable filter medium.

The need to selectively separate component particles in a fluid medium is a frequently occurring problem in technological procedures. Since such component particles may be of infinitely varying sizes, it is impossible to use any single filter medium to cover the full range of particle selectively. Therefore, a fixed filter medium is a significant limiting factor in filtration devices.

This invention provides a filter unit which provides interchangeability of the filter media. Further, the filters are very readily interchanged. The parts of the entire assembly are kept to a minimum for ease of filter changing. The filter units of the invention can use an interchangeable porous filter disc alone or in combination with interchangeable membrane filters. Therefore, this invention provides a highly selective filtration unit.

SUMMARY OF THE INVENTION

The filtration unit of this invention comprises apparatus that includes a porous filter disc alone or in combination with a membrane filter. The apparatus is so designed that either or both the filter disc and the membrane filter can be readily replaced with a filter disc and/or a membrane filter of different porosity. In other words, the filter unit of this invention provides for easy interchangeability of porous discs of varying porosity and/or membrane filters of varying porosity; thereby providing a means to selectively separate component particles in a fluid medium.

Single filter units that can accommodate either a single porous filter disc alone or in combination with a membrane filter and dual filter units that accommodate two spaced apart porous filter discs alone or in combination with membrane filters are disclosed. In both the single or dual filter units a part of the unit is designed to accommodate the porous filter disc or filter discs. The membrane filter in the single unit or the membrane filters in the dual unit are supported by the associated porous filter disc. A screw cap in the single unit and a pair of screw caps in the dual unit are provided to secure the various parts of a filter unit together. The parts of the filter unit are so designed that when a unit is assembled a liquid tight seal is formed at the point where the parts are joined. Further, to replace a porous filter disc and/or a membrane filter, one need merely unscrew the associated screw cap, replace the filter disc and/or membrane and again secure the screw cap, thereby providing for easy interchangeability of the filter media.

BRIEF DESCRIPTION OF THE DRAWING

The exact nature and structural details of the invention can be obtained from the following detailed description of the invention when read in conjunction with the annexed drawing in which:

FIG. 1 is a pictorial view showing a first embodiment of the invention;

FIG. 2 is a pictorial view showing a variation of the embodiment of FIG. 1;

FIG. 3 is a fragmented cross-section view showing the structural details of the embodiment of FIG. 1 with the components unassembled;

FIG. 4 is a fragmented cross-section view showing the components of FIG. 3 assembled;

FIG. 5 is a pictorial view showing a second embodiment of the invention;

FIGS. 6, 7 and 8 are pictorial views showing various interchangeable funnel pieces that can be used with the embodiment of FIG. 5;

FIG. 9 is a pictorial view showing only the column or central part of the embodiment of FIG. 5; and FIG. 10 is a fragmented cross-section view showing the structural details of the embodiment of FIG. 5 with the various components unassembled.

DETAILED DESCRIPTION OF THE INVENTION

Referring first to FIG. 1, this Figure shows a pictorial view of a first embodiment of the filtration unit of this invention. As shown in FIG. 1, the unit comprises a tube reservoir 1, a screw cap 2 and a funnel or discharge tube 3. As will be apparent later, a porous filter disc alone or in combination with a membrane filter hidden by screw cap 2 are also provided. Funnel or discharge tube 3 may have a long stem 10 that fits through the rubber stopper 4 of a receiving flask 5 (only the neck of receiving flask 5 is shown).

FIG. 2 shows a filter unit similar to the filter unit of FIG. 1. Thus, the unit of FIG. 2 comprises tube reservoir 1, screw cap 2 and the funnel or discharge tube 6. Funnel or discharge tube 6 is provided with a stopcock 7 where funnel 3 of FIG. 1 does not have a stopcock. Otherwise the units are identical; and therefore, the reservoirs are interchangeable. As is the case with funnel 3, funnel 6 may have a long stem 11 that fits through a rubber stopper 8 of the flask 9.

FIGS. 1 and 2 are presented to show that various different shaped funnels or discharge tubes may be utilized. The various different shaped funnels must however have specific identical structural features as will be apparent later herein when FIGS. 3 and 4 are described. Similarly, reservoirs having shapes different than the shape of reservoir 1 of FIGS. 1 and 2 may be utilized provided that the reservoirs have the specific structural features shown in FIGS. 3 and 4.

Referring now to FIG. 3, this Figure shows a portion of the unit of FIG. 1 in cross-section. In this Figure the various components are unassembled. As shown in FIG. 3, reservoir tube 1 has a lip or flange 12 at its lower end. Reservoir tube 1 is preferably made of glass or other suitable inert material and flange or lip 12 is fired and/or polished so as to provide a smooth even surface 21 over its entire circumference. Screw cap 2 has a circular opening 13 in its top to permit screw cap 2 to pass over reservoir tube 1. However, opening 13 is just large enough to accomodate reservoir tube 1. Lip or flange 12 will not pass through opening 13 but will instead abut the inner surface 14 of screw cap 2 when screw cap 2 is at the extreme lower end of reservoir tube 1. Thus, reservoir tube 1 will not completely pass through screw cap 2 because of lip 12 and surface 14.

A plurality of internal threads 15 are provided in screw cap 2 and a plurality of external threads 16 that mate with threads 15 of cap 2 are provided at the upper end of funnel or discharge tube 3. A receptacle 17 is formed in the inside of the top end of funnel 3. As is the case with lip 12, the upper surface 20 of funnel 3 is fired and/or polished so that surface 20 is smooth and even along its entire circumference.

A porous filter disc 18 fits down into receptacle 17. Receptacle 17 and porous filter disc 18 are precision formed so that filter disc 18 fits snugly into receptacle 17 with the top of filter disc 18 flush with surface 20 of funnel 3.

A membrane filter 19 may also be provided. In the assembled position, membrane filter 19 rests on top of porous filter 18 and surface 20 as can be seen in FIG. 4.

FIG. 4 shows the components of FIG. 3 assembled. As shown in FIG. 4, porous filter disc 18 is seated in receptacle 17 of funnel 3. Membrane filter 19 fits on top of porous filter disc 18 and smooth surface 20. Screw cap 2 is securely threaded onto the threads 16 of funnel 3; thereby drawing smooth lower surface 21 of lip 12 of reservoir 1 down on top of membrane filter 19. The surface 14 of cap 2 presses smooth lower surface 21 of lip 12 firmly against the top of membrane filter 19. When assembled as shown in FIG. 4, the surface 21 of lip 12, membrane filter 19, the surface 20 of funnel 3 and porous filter 18 are securely held in the position shown by screw cap 2. Surface 21, membrane filter 19 and surface 20 form a tight seal. Membrane filter 19 is optional. That is, membrane filter 19 can be omitted. Surface 21 of lip 12 mating with surface 20 of funnel 3 will provide a tight seal in the absence of membrane filter 19.

In operation, the filtration is, of course, accomplished by introducing the sample to be filtered into reservoir 1. The sample consists of a fluid in which particles of varying size are suspended. Before introducing the sample in reservoir 1, a decision as to what size particles are to be filtered out is made and the filter or filters having the appropriate porosity are selected and the filter unit assembled as in FIG. 4. Porous disc filters such as filter 18 generally have a higher degree of porosity than membrane filters such as membrane filter 19. Thus, if only relatively large particles are to be filtered out, a filter disc 18 having the desired porosity is selected; the unit is assembled; and the sample introduced into reservoir 1. If particles of a smaller size than can be filtered by porous disc 18 are to be filtered out, a membrane filter 19 having the desired degree of porosity is used in combination with disc filter 18. Thus, by selecting a membrane filter of proper porosity and/or a disc filter of proper porosity one can selectively filter out any desired size particles. All particles larger than the porosity of the filter system will, of course, remain in reservoir 1 with the fluid and smaller particles passing through the filter system into funnel 3 and if used, into a flask such as flask 5 of FIG. 1 or flask 9 of FIG. 2. The transfer of the sample through the filter system is accomplished by gravity flow. Of course, positive pressure on reservoir 1 or negative pressure in funnel 3 or a combination of these may be used in a well known manner. If flasks such as flasks 5 and 9 are utilized, the filtered liquid will, of course, be collected in the flasks. As will be obvious to those skilled in the art, such flasks are not required; beakers or any other suitable collector receptacle could be used.

From the foregoing description of the filter of FIG. 1, it should be obvious that the filter unit of this invention provides a high degree of flexibility and is simple in use and structure. One merely selects the desired membrane and/or disc filter, places the disc filter in the receptacle provided in the funnel unit; places the membrane filter over the disc filter if a membrane filter is used and screws the parts together using the screw cap. If one wishes to refilter the fluid using a smaller pore size membrane and/or filter disc, he merely disassembles the unit, washes the reservoir and funnel units, places the appropriate membrane filter and/or disc filter in the unit as described and reassembles the unit. The operation is very simple and can quickly be completed.

While FIG. 3 has been described as being a cross-section of the FIG. 1 embodiment, the embodiment of FIG. 2 has the identical structural arrangement under screw cap 2. The only difference between the two filter units is that the funnel 6 of FIG. 2 is provided with a stopcock. In this respect, the reservoir provided and the funnel provided can have any desired shape. The only limitations are that the funnel must have a receptacle of proper size to accomodate the disc filter, be of such size and have appropriate threads to accomodate the screw cap and have a smooth even top surface; and the reservoir must be of proper size to accomodate the screw cap and have a lip with a smooth even surface on the bottom end.

In some filtration processes, it is desirable to provide a dual filtration process. This, of course, could be provided with the units of FIGS. 1 and 2 by changing the disc filter and/or membrane filter, if one is used, as described above. However, in some cases such a procedure is not desirable or appropriate. Therefore, in order to avoid such a two-step procedure, a dual filter arrangement such as the embodiment of FIG. 5 is provided by this invention. The specific embodiment shown in FIG. 5 is ideally suited for use in column chromatography procedures. As shown in FIG. 5, the filter unit comprises a reservoir 30, a first screw cap 31, a column tube 32, a second screw cap 33 and a funnel 34.

While specific structural shapes are shown for the reservoir 30 and the funnel 34, different shaped reservoirs and funnels can be used provided that the structural characteristics of the reservoirs and funnels hidden by screw caps 31 and 33, respectively, are identical to the structural characteristics of reservoir 30 and funnel 34 for reasons that will be apparent later herein from the description of FIG. 10. Different shaped funnels that can be used, particularly in column chromatography procedures, are shown in FIGS. 6, 7 and 8. Thus, FIG. 6 shows a funnel 35 having a screw cap 36 and a stopcock 37; FIG. 7 shows a funnel 38 having a screw cap 39 and FIG. 8 shows a funnel 40 having a screw cap 41. Of course, as mentioned, funnels having shapes different than those shown in FIGS. 5, 6, 7 and 8 can be provided and while no other shaped reservoirs are shown in the drawing, reservoirs having shapes different than the shape of funnel 30 can be provided.

FIG. 9 shows column tube 32 separated from the balance of the unit of FIG. 5. As more fully explained with reference to FIG. 10, column tube 32 has external threads 49 and an internal receptacle 51 at one end and threads 50 and receptacle 52 at the other end. While column tube 32 is shown as having a particular length, column tubes identical to column tube 32 except for length can be provided. Such different length column tubes would normally be provided with a chromatography kit. Of course, for other uses or procedures, devices having shapes other than the shape of column tube 32 can be used in place of column tube 32 provided that these other shaped devices are externally threaded at each end and are provided with an internal receptacle at each end for reasons that will be apparent from the following description of FIG. 10.

FIG. 10 shows the unit of FIG. 5 in cross-section with the various parts disassembled. As shown in FIG. 10, reservoir 30 has a lip or flange 44 at its lower end. Reservoir 30 is made of glass or other suitable inert material and lip 44 is fired and/or polished so that the surface 45 of lip 44 is smooth and even over the entire circumference. Cap 31 has a hole 46 in the top through which reservoir 30 protrudes. However, hole 46 is of such size that lip 44 can not slip through hole 46. Instead, the upper surface of lip 44 rests against the surface 47 of screw cap 31 when reservoir 30 is fully extended through hole 46. Screw cap 31 has the internal threads 48 formed in its inside surface.

Column tube 32 has a set of external threads 49 formed along its upper end and a set of external threads 50 formed along its lower end. Threads 49 are so shaped that these threads will accomodate the threads 48 of screw cap 31. A receptacle 51 is formed inside the upper end of column tube 32 and a receptacle 52 is formed inside the lower end of column tube 32. Column tube 32 is made of glass or other suitable inert material and the end surfaces 53 and 54 are fired and/or polished so these surfaces will be smooth and even.

Funnel 34 projects through the hole 55 provided in screw cap 33. Funnel 34 has a lip or flange 56 at its upper end. Lip or flange 56 is of such size that funnel 34 can not completely pass through screw cap 33. Instead the lower surface of lip or flange 56 rests against surface 57 of screw cap 33 when funnel 34 is fully extended through screw cap 33. Funnel 34 is made of glass or other suitable inert material and the surface 58 of lip 56 is fired and/or polished as that surface 58 is smooth and even along its entire circumference.

A set of internal threads 59 are provided along the inner surface of screw cap 33. Threads 59 mate with threads 50 of column tube 32.

A porous disc filter 60 fits into receptacle 51 of column tube 32. Filter disc 60 and receptacle 51 are precision formed so that filter disc 60 fits snugly into receptacle 51. A membrane filter 61 may also be provided. When used, membrane filter 61 rests on top of filter disc 60 and surface 53 of column tube 32.

Similarly, a filter disc 62 which fits into receptacle 52 of column tube 32 is provided. Filter disc 62 and receptacle 52 are precision formed so that filter disc 62 fits snugly into receptacle 52. A membrane filter 63 may also be provided. Membrane filter 63, if used, rests against filter disc 62 and surface 54 when the apparatus is assembled.

To assemble the filter unit of FIG. 3, one merely places filter disc 60 into receptacle 51 and places membrane filter 61 on top of filter disc 60 and surface 53, if membrane filter 61 is used, and then screws cap 31 securely onto column tube 32 by means of the threads 48 and 49. Similarly, the lower end of the unit is assembled by placing filter disc 62 into receptacle 56, placing membrane filter 63 on filter disc 62 and surface 54, if membrane filter 63 is used, and then securing cap 33 to column tube 32 by means of threads 57 of cap 33 and threads 50 of column tube 32. Of course, the lower unit of filter disc 62, membrane filter 63, funnel 34, column tube 32 and screw cap 33 could be assembled first and then the upper unit of filter disc 60, membrane filter 61, reservoir 30, column tube 32 and screw cap 31 could be assembled last. In other words, the order of assembling the unit is not critical.

When assembled as described above, smooth even surface 45 of lip 44, membrane filter 61 and smooth surface 53 of column tube 32 form a liquid tight seal. Similarly, smooth even surface 58 of lip or flange 56, membrane filter 63 and smooth even surface 54 of column tube 32 form a liquid tight seal when screw cap 33 is securely fastened to column tube 32. Surface 57 pushes on lip or flange 56 to tightly seal the lower unit when screw cap 33 is fastened to column tube 32 and the surface 47 of screw cap 31 pushes on lip 44 to form the tight seal when screw cap 31 is fastened to column tube 32. If membrane filter 61 is not used, surface 45 of lip 44 and surface 53 of column tube 32 will form a tight seal. Similarly, if membrane filter 63 is not used, surface 54, column tube 32 and surface 58 of lip 56 will form a tight seal.

When the filter unit is assembled as described above, the unit is ready for use. A liquid introduced into reservoir 30 will flow down through reservoir 30 and be filtered by filter disc 60 and membrane filter 61 if membrane filter 61 is used. These filters will, of course, filter out particles suspended in the liquid. The size of the particles filtered out will depend upon the porosity of membrane filter 61 and disc filter 60. If only relatively large particles are to be filtered out at this stage, only a disc filter is needed.

After this first filtration, the filtered liquid will flow down column tube 32 and will again be filtered by filter disc 62 and membrane filter 63 if membrane filter 63 is used. If any filtration is to take place at this lower point, it is obvious that the porosity of this lower filter media must be less than the porosity of the upper filter media. After this second filtration the filtered liquid will pass through funnel 34. The filter unit can then be taken apart and the particles filtered out by the two sections can be examined if desired and the unit can be washed and new membrane and/or filter discs having different porosities can be substituted for filter discs 60 and 62 and membrane filters 61 and 63 to further filter the liquid or to filter a different liquid.

As has been mentioned above, the unit of FIG. 10 is not limited to the specific structural shapes shown in FIG. 10. Different shaped elements can be used for reservoir 30, column tube 32 and funnel 34. However, these different shaped elements must have lips or flanges similar to lips 44 and 56 of reservoir 30 and funnel 34 respectively, must have screw caps associated with the reservoir and funnel and must have in the center piece (i.e. column tube 32) receptacles to hold the filter discs and threads to mate with the threads of the screw caps.

From the foregoing description of the unit of FIG. 10, it is apparent that this unit provides for a selective dural filter unit. One merely selects the filter media having the proper porosities for a particular filtration process. Filter discs and membrane filters having a wide range of porosities can be provided so that highly selective filtration can be accomplished.

While specific embodiments of the invention have been described and shown, it will be obvious to those skilled in the art that various changes and modifications can be made to the embodiments shown and described without departing from the spirit and scope of the invention as set forth in the claims.

What is claimed is:

1. A filter unit comprising:
a reservoir;
a hollow cylindrical screw cap being open at one end and having a circular opening smaller in diameter than the inside diameter of said screw cap in the other end, said screw cap also having internal threads formed therein;

a flange integrally formed on one end of said reservoir, the diameter of said flange being larger than said diameter of said circular opening in said screw cap but smaller than the inside diameter of said screw cap, said reservoir protruding through said circular opening in said screw cap, said flange preventing said reservoir from passing completely through said circular opening in said screw cap;

a funnel having external threads along one end thereof and a receptacle formed inside said one end, said external threads of said funnel being of such size as to mate with said internal threads of said screw cap; and a filter disc housed in said receptacle, said filter unit being assembled by placing said filter disc in said receptacle and securely threading said screw cap onto said external threads of said funnel.

2. A filter unit as defined in claim 1 wherein said flange has a smooth even surface.

3. A filter unit as defined claim 2 wherein said one end of said funnel has a smooth even surface.

4. A filter unit as defined in claim 3 wherein a membrane filter is supported by said disc filter and said one end of said funnel.

5. A filter unit as defined in claim 4 wherein said funnel is provided with a stopcock.

6. A filter unit comprising:
a reservoir;
a first hollow cylindrical screw cap being open at one end and having a circular opening smaller in diameter than the inside diameter of said first screw cap in its other end, said first screw cap also having internal threads formed therein;
a flange integrally formed on one end of said reservoir, the diameter of said flange of said reservoir being larger than said diameter of said circular opening of said first screw cap but smaller in diameter than the inside diameter of said first screw cap, said reservoir protruding through said circular opening of said first screw cap, said flange of said reservoir preventing said reservoir from passing completely through said circular opening of said first screw cap;
a funnel;
a second hollow cylindrical screw cap being open at one end and having a circular opening in its other end, said circular opening in said other end of said second screw cap being smaller in diameter than the inside diameter of said second screw cap, said second screw cap also having internal threads formed therein;
a flange integrally formed on one end of said funnel, said funnel protruding through said circular opening in said second screw cap, said flange formed on said one end of said funnel having a sufficiently large diameter to prevent said funnel from passing completely through said circular opening of said second screw cap;
a central hollow element having first threads for mating with first screw cap formed along one end, a first receptacle formed inside said one end, second threads formed along its other end for mating with said second screw cap and a second receptacle formed inside said other end;
a first filter disc housed in said first receptacle; and
a second filter disc housed in said second receptacle, said filter unit being assembled for use by placing said first filter disc in said first receptacle, said second filter disc in said second receptacle, tightly threading said first screw cap on said first threads and tightly threading said second screw cap on said second threads.

7. A filter unit as defined in claim 6 wherein a first membrane filter is provided, said membrane filter covering said first filter disc and being sandwitched between said flange of said reservoir and said one end of said central hollow element when said first screw cap is secured to said first threads.

8. A filter unit as defined in claim 7 wherein a second membrane filter is provided, said second membrane filter covering said second disc filter and being sandwitched between said flange of said funnel and said other end of said hollow central element when said second screw cap is secured to said second threads.

9. A filter unit as defined in claim 8 wherein said flange of said reservoir, said flange of said funnel, said one end of said hollow central element and said other end of said hollow central element all have smooth even surfaces.

10. A filter unit as defined in claim 9 wherein said reservoir, said hollow central element and said funnel are all made of glass.

11. A filter unit as defined in claim 5 wherein said reservoir and said funnel are both made of glass.

* * * * *